Sept. 8, 1970   H. J. LALONDE ET AL   3,527,348
METHOD AND APPARATUS FOR SEPARATING IMMISCIBLE LIQUIDS
Filed Nov. 21, 1968  2 Sheets-Sheet 1
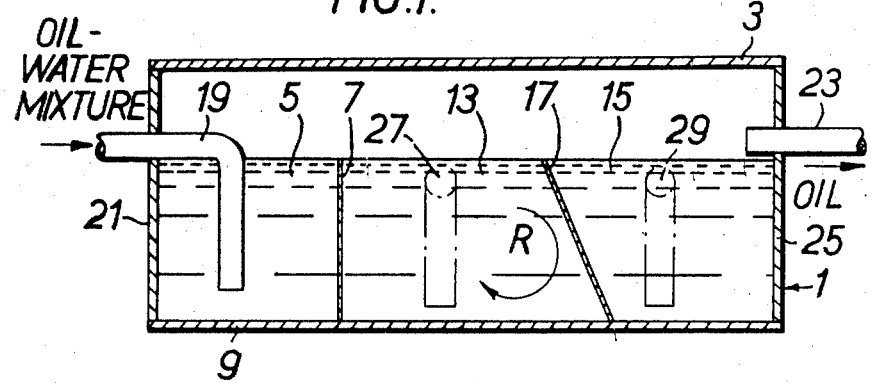
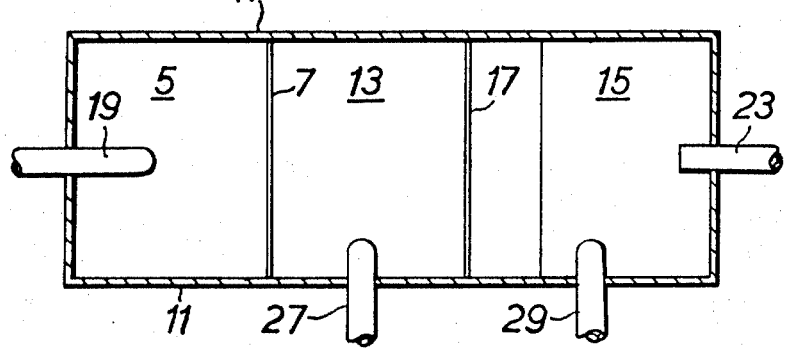
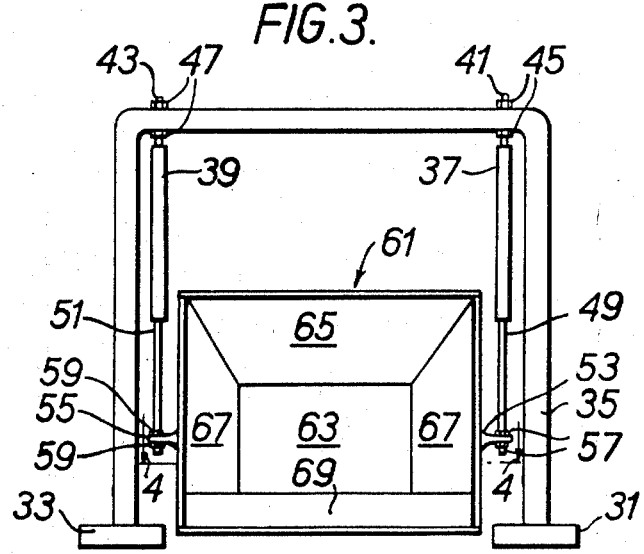

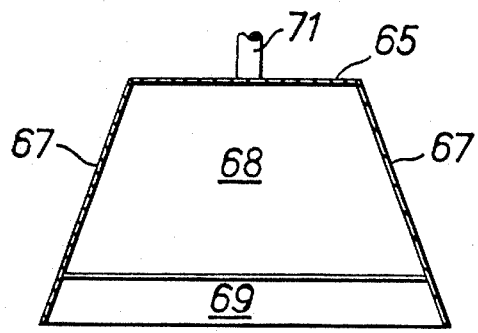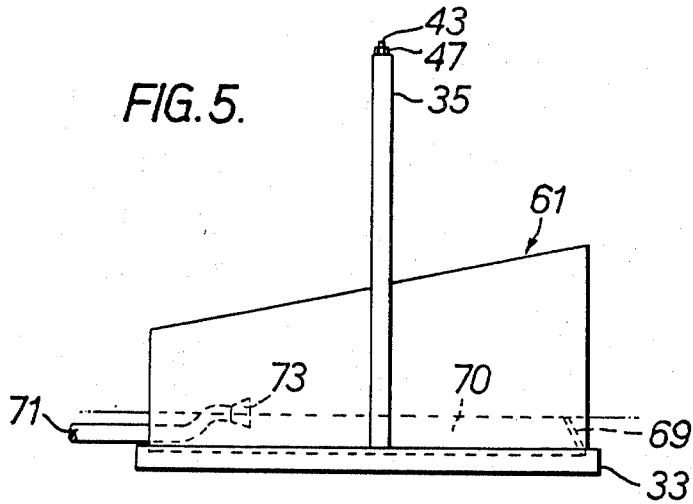

United States Patent Office 3,527,348
Patented Sept. 8, 1970

3,527,348
METHOD AND APPARATUS FOR SEPARATING IMMISCIBLE LIQUIDS
Henri Joseph Lalonde and Shirley Isabelle Lalonde, both of St. Andrews West, Ontario, Canada
Filed Nov. 21, 1968, Ser. No. 777,579
Int. Cl. B01d 21/10
U.S. Cl. 210—84                                 5 Claims

ABSTRACT OF THE DISCLOSURE

A rectangular tank having an inclined baffle plate across it such that when an oil-water mixture is made to flow from one end of the tank to the other, the mixture rotates against the plate in a toroidal fashion and the oil separates from the water. The separated oil and water are removed by suitably placed outlets.

---

This invention relates to a separator which is capable of separating a mixture of two immiscible liquids of different densities and more specifically is capable of separating oil and water from a mixture of the two.

There are numerous instances in which it is necessary to separate oil-water mixtures both for reasons of pollution and economics.

In shipping lanes, there often occurs large quantities of oil which are normally dumped accidentally. Due to unfavourable weather conditions, this dumped oil is sometimes deposited upon land, and if this occurs in an inhabited area, great hardship often occurs through pollution. In such a case, it would be preferable to remove the oil from the water before the oil contaminates the land area. The apparatus of this invention is capable of removing oil from the water for collection, for instance, in a tanker.

There is also a condensation problem in oil storage tanks in that the condensation which occurs in the upper part of an oil storage tank, runs down the sides of the tank and collects as a layer of water in the bottom of the tank. This layer of water is not well defined, and when attempting to run off the water from an oil storage tank, it is common to waste a quantity of oil which is carried out with the water. The apparatus of this invention can be used for separating the oil from the oil-water mixture as it leaves the tank, such that the oil can be returned back into the tank for use. An oil storage tank system can therefore be made to operate more economically than is presently possible.

Oil contamination problems are also encountered in any body of water such as a river, stream, or harbour.

There are numerous types of oil separation devices available commercially, however the majority of these are of a large size and of a complicated nature. One of the simplest types of separation devices is that shown in U.S. Pat. No. 1,672,583 granted on June 5, 1928 to J. T. Travers. The separation device of this patent utilizes a basic principle which is followed by the commercial type of separation devices, in that a body of oil-water mixture is merely allowed to stand in an almost motionless state, the oil rising to the top of the body of the mixture and passing over a weir which is set at a specific height. Although the apparatus as shown in the above mentioned patent does separates oil from a mixture of oil and water, the process is extremely slow and as a consequence extremely large settling tanks have to be used if it is required to process a large quantity of oil-water mixture.

The apparatus of this invention does not utilize the static separation process as used in commercial separation tanks but instead utilizes a dynamic process in which the oil-water mixture is rotated in a toroidal manner.

Generally the apparatus of this invention consists of a tank having, in its basic elongated form, a mixture inlet at one end, and oil and water outlets at the other end. A baffle extends across the tank near the inlet end, the baffle being of a height less than the height of the tank such that a compartment is formed which can be filled up with oil-water mixture up to the height of the baffle before overflowing. A deflector is positioned across the tank downstream of the baffle so forming a compartment between the baffle and the deflector and a compartment between the deflector and the outlet end of the tank. The deflector is of the same general height as the baffle, however it is shaped so that the oil-water mixture which impinges on it is forced to rotate in a toroidal manner.

In operation, the tank is filled with an oil-water mixture, and the interface, which is formed in the compartment at the outlet end of the tank between the oil and water mixture, is held at a height above the height of the baffles by suitably regulating the inlet and outlet flow rates. Such regulation can be achieved by either manual or automatic means. When the oil-water mixture reaches the compartment having the specially formed baffle, the oil-water mixture swirls in a toroidal fashion, this swirling effect physically separating the mixture such that the oil is thrown towards the top of the tank while the water remains in the compartments. Preferably the tank is closed to both prevent the liquid from splashing out of the tank and permit pressurizing of the liquid passing through the tank.

For collecting an oil-water mixture from the surface of a body of water, a skimmer can be used which utilizes a baffle plate to hold a quantity of mixture in the bottom of the skimmer. This mixture can be drawn off and passed through the separator. For collecting oil in shipping channels, the skimmer can be conveniently mounted on pontoons and its height adjusted to suit the thickness of oil polluting the water. For cleaning small streams, the skimmer can be attached to supports on both banks of the stream and can be moved vertically so that only the oil-water mixture is collected. For cleaning harbours, the skimmer can be built into the breakwater enclosing the harbour, and movably supported such that it can be adjusted to the requisite height, and if required, can be mounted on pontoons so that it will follow the wave action.

The invention will now be described with reference to the accompanying drawings which show one embodiment of the separator and the skimmer.

FIG. 1 is an elevational view of one embodiment of the separator of this invention shown in partly schematic form;

FIG. 2 is a schematic plan view of the separator of FIG. 1;

FIG. 3 is a front elevational view of one embodiment of the oil-water skimmer of this invention, shown partly in schematic form;

FIG. 4 is a sectional plan view on line 4—4 of FIG. 3; and

FIG. 5 is a side elevational view of the skimmer of FIG. 3 shown in partly schematic form.

Referring to FIGS. 1 and 2, the separator consists of a rectangular tank 1, a top cover 3 which can be attached to the tank by bolts (not shown) or any other suitable means such that the cover will seal the top of the tank 1 and be removable for cleaning purposes. A compartment 5 is formed at one end of the tank 1 by a transverse baffle 7 which is welded or otherwise suitably secured to the bottom 9 and the sides 11 of the tank. Second and third compartments 13 and 15 are formed by an inclined transverse deflector 17 welded or otherwise suitably secured to the bottom 9 and the sides 11 of the tank.

An inlet pipe 19 passes through an end wall 21 of the tank 1, pipe 19 being bent so as to introduce oil-water mixture into the lower portion of the compartment 5. An oil outlet 23 is provided in the other end wall 25 of the tank 1. Water outlet pipes 27 and 29 are provided in communication with compartments 13 and 15, the pipes 27 and 29 being positioned so as to remove water from the lower region of the compartments.

Although they have not been shown, it is understandable that valves will be provided on the inlet and outlet pipes for regulating the flow of liquid. In order to be able to remove only oil from outlet 23, it is seen that the interface of the oil and water in compartment 15 will have to be held below the height of the oil outlet pipe 23, and although no height control has been shown there are numerous systems which could be conveniently used. For instance, a well known water gauge type of instrument could be used to visually show the level of the oil-water interface, and control of the interface could be achieved merely by manual operation of the various valves on the inlet and outlet pipes. Alternatively float or pressure control switches could be utilized in an automatic interface height control system. If required, an air bleed (not shown) can be fitted in the top cover 3 to remove entrapped air from the tank.

Referring specifically to FIGS. 3, 4 and 5, the skimmer consists of pontoons 31 and 33 and an inverted U-shaped framework 35 between the pontoons. The pontoons will preferably be of hollow metal construction and the U-shaped framework fabricated of metal and welded to the pontoons. A pair of hydraulic actuators 37 and 39 are secured to the upper part of the framework 35 by integral studs 41 and 43 which pass through holes in the framework 35 and are held in position on the framework by nuts 45 and 47. The piston rod ends 49 and 51 of the actuators 37 and 39 respectively pass through mounting lugs 53 and 55 and are held in place on the lugs by nuts 57 and 59 which are threaded onto the ends of the piston rods. The lugs are welded or otherwise suitably secured to the sides of a sheet metal enclosure 61 which has a rear wall 63, a top wall 65, and side walls 67, the top and side walls being divergent from the rear wall such that the front opening in the enclosure is of larger size than the rear wall. A horizontal base wall 68 meets the lower edge of the rear wall 63 and the lower edges of the side walls 67. An inclined baffle plate 69 is secured by welding or the like from the front edge of the lower wall 68 and connects with the side walls 67 to form a shallow tray 70 in the base of the enclosure. A pipe 71 passes through the lower portion of the rear wall 63, this pipe having a funnel 73 arranged at a height such that it will always be at least partly immersed in the oil-water mixture in the shallow tray 70.

The pipe 71 is connected to a suitable pump which can transport oil-water mixture to the inlet pipe 19 of the separator as shown in FIGS. 1 and 2.

The height of the enclosure 61 can be varied by the hydraulic actuators 37 and 39 to suit the thickness of oil-water mixture which is present on top of the polluted water. If the size of the skimmer is large, guides and guide rails (not shown) can be utilized between the framework 35 and the enclosure 61, for strengthening purposes. If the skimmer is to be used in conjunction with a ship, an attachment (not shown) can be provided to connect the framework 35 to the ship. This attachment will preferably provide a pivotable mounting between the skimmer and the ship so that the skimmer is free to follow the wave action.

During operation of the separator, the oil-water mixture is fed into the tank 1 through pipe 19 which can be connected to the skimmer such as shown in FIGS. 3, 4 and 5, or to any other source of oil-water mixture. Much frothing occurs in compartment 5, and it is found that little separation takes place in this compartment. Oil-water mixture flows over the baffle 7 and after entering compartment 13 is forced, by the deflector 17, to rotate in a clockwise direction as shown by R in FIG. 1. This toroidal movement of the oil-water mixture physically separates the oil from the mixture, the oil forming layers towards the outside of the toroid, such that if the oil-water interface in compartment 15 is held at a level approximately the height of the deflector 17, the layers of oil will be thrown towards the top of the tank 1 while the water will be held in the compartments. The separated oil can then be removed through the pipe 23 while the water can be removed mainly through pipe 29.

Although an inclined deflector 17 has been shown in the preferred embodiment of the invention, it is to be understood that any shape of deflector which will force the oil-water mixture to rotate in a toroidal fashion would provide satisfactory operation of the separator. It is also to be understood that the use of a number of deflectors, positioned in series along the direction of flow, may be used to advantage.

If found necessary, the separation process may be assisted by pressurizing the tank by introducing compressed air through the cover or by throttling the oil and water outlets.

It is also understandable that, although the invention has only been described with reference to an oil-water mixture, any type of similar mixture of immiscible liquids which will normally separate in standard type separation tanks can also be separated in a much more efficient manner by the separator of this invention.

We claim:
1. A liquid separator comprising a tank having side walls, and a base, a baffle across the tank forming a first compartment with the side walls and the base; a deflector across the tank and downstream of the baffle forming a second compartment with the side walls, the base, and the baffle, and a third compartment with the side walls and the base; the baffle and the deflector being of less height than the side walls such that the compartments are in communication with one another at their upper ends; a liquid mixture inlet in the first compartment; a first outlet from the third compartment situated above the height of the deflector; a second outlet from the third compartment situated below the height of the deflector; the deflector being shaped such that when a liquid mixture enters the second compartment and impinges on the deflector, the mixture is forced to flow towards the base and into a toroidal flow path.

2. The separator of claim 1, wherein said deflector has its upper edge closer to the inlet than its lower edge.

3. The separator of claim 2, wherein said deflector is a flat plate inclined to the base.

4. The separator of claim 1, wherein the tank is provided with a top cover.

5. A method of separating a mixture of two immiscible liquids of different densities comprising the steps of:
  feeding the mixture into the first of two compartments,
  maintaining the level of the interface between the two liquids at a height at least equal to the height of a deflector separating the two compartments and over which any liquid must pass in moving from the first to the second compartment,
  controlling the mixture in the first compartment to move in a generally toroidal path,
  and drawing off the lighter of the two liquids from the second compartment at a level above that of the interface and draining off the heavier of the two liquids at a level below that of the interface.

References Cited

UNITED STATES PATENTS

| | | | |
|---|---|---|---|
| 2,330,508 | 9/1943 | McColl | 210—83 X |
| 2,782,929 | 2/1957 | Colket | 210—320 X |
| 2,876,903 | 3/1959 | Lee | 210—523 X |
| 3,161,590 | 12/1964 | Weis et al. | 210—521 X |
| 3,237,774 | 3/1966 | Schuback | 210—242 |
| 3,272,343 | 9/1966 | Caldwell | 210—532 X |
| 3,346,117 | 10/1967 | Page | 210—304 |

JAMES L. DECESARE, Primary Examiner

U.S. Cl. X.R.

210—320, 540